United States Patent [19]

Chichester, Jr.

[11] 4,338,755
[45] Jul. 13, 1982

[54] FASTENER ASSEMBLY

[76] Inventor: S. Tebbs Chichester, Jr., 2529 P St. NW., Washington, D.C. 20007

[21] Appl. No.: 138,924

[22] Filed: Apr. 10, 1980

Related U.S. Application Data

[63] Continuation-in-part of Ser. No. 45,872, Jun., 1979, abandoned.

[51] Int. Cl.³ .......................... E04B 5/52; F16B 35/00
[52] U.S. Cl. ...................................... 52/484; 52/489; 411/57; 411/366; 411/392
[58] Field of Search ............... 411/366, 392, 374, 378, 411/57, 60, 15; 52/484, 489, 486, 485, 39; 248/343, 342, 317

[56] References Cited

U.S. PATENT DOCUMENTS

| 1,978,935 | 10/1934 | Douglas | 411/60 |
| 2,386,922 | 10/1945 | Andrews et al. | 411/15 |
| 2,956,605 | 10/1960 | Rapata | 411/531 |
| 3,014,564 | 12/1961 | Thomsen et al. | 52/484 X |
| 3,499,257 | 3/1970 | Heverly et al. | 52/484 |
| 3,874,264 | 4/1975 | Polos | 411/57 |
| 3,905,141 | 9/1975 | Chichester | 40/125 F |

FOREIGN PATENT DOCUMENTS

| 108800 | 5/1966 | Norway | 52/484 |
| 407485 | 8/1966 | Switzerland | 52/484 |
| 606902 | 8/1948 | United Kingdom | 411/392 |
| 944068 | 12/1963 | United Kingdom | 52/484 |

Primary Examiner—Ramon S. Britts
Attorney, Agent, or Firm—Schwartz, Jeffery, Schwaab, Mack, Blumenthal & Koch

[57] ABSTRACT

A fastener assembly including a nut member frictionally temporarily affixed in an opening in a support member, and a bolt having a tightly wound helical spring shank. The nut member is formed with a threaded recess for receiving the spring shank, and compressible leading end segments which expand behind the supporting member when the nut is snapped in place. The nut member can be withdrawn if desired while the bolt shank is in threaded engagement with the nut. When so engaged, the flexible bolt shank can be moved in any direction to facilitate installation and removal of objects supported by a plurality of fastener assemblies.

16 Claims, 10 Drawing Figures

FASTENER ASSEMBLY

CROSS-REFERENCE TO RELATED APPLICATION

The present application is a continuation-in-part of my application Ser. No. 45,872, filed June 6, 1979, now abandoned.

BACKGROUND OF THE INVENTION

The present invention relates as indicated to a fastener assembly, and relates more particularly to a fastener assembly which can be removably mounted through an opening in a supporting member for temporarily and removably mounting objects, such as signs or panels, on such support member or members. Although a plurality of fastener assemblies are normally employed, the invention can also be advantageously employed as a single such fastener assembly for retaining relatively thin objects such as paper, thin cardboard or the like.

The prior art is replete with fastener assemblies for mounting objects to a supporting surface. The assemblies frequently are fixed in nature and typically comprise an expansible nut which is positioned through an opening in the support member and which expands behind the support member when the male member of the assembly is threaded into the nut. Such expansion prevents withdrawal of the nut member through the opening provided therefor in the support member, thereby providing a fixed or permanent installation. U.S. Pat. No. 1,646,366 to Carr is a typical example of this type of construction.

It is also known in the art to provide expansible members secured to sign objects, with the expansible members being flexed when extending through openings in a supporting member, and thereafter expanded for retaining the sign object in place. An example of this type of construction is shown in U.S. Pat. No. 3,089,269 to McKiernan, which discloses sign letters to which are permanently secured a plurality of tapered plug members which can be compressed and inserted through openings in the supporting member, which is disclosed as being pegboard. Although each sign letter can be readily removed, the sign letter, when in place, is relatively fixed, and the letters do not in any way function to temporarily and removably retain additional objects between such letters and the supporting member.

The use of a coil spring which functions similar to a threaded bolt is likewise shown in the art. British Pat. No. 606,902 discloses a bolt the shank of which comprises a tightly wound resilient coil of wire. However, the coil is threadedly secured into a retaining or backing plate positioned behind the supporting member, with the backing plate being constructed so as to prevent removal thereof through the opening formed in the supporting member, thereby preventing withdrawal of the fastener assembly without first disengaging the coil spring shank from the backing member. Moreover, the installation of the bolt shank is such that the spring is threadedly engaged in the backing plate so as to relatively tightly engage a front plate with the supporting member, thereby totally eliminating any use of the flexible characteristics of the coil spring shank for use for temporarily securing objects positioned between the head of the bolt and the supporting member.

U.S. Pat. No. 3,260,149 to Deaver discloses a loosely wound coil spring fastener used to temporarily secure a license plate to the bumper of a vehicle. The leading edge of the coil spring is inserted through aligned openings in the license plate and the bumper, with subsequent rotation of the coil spring serving to position part of the coils behind the bumper to prevent removal of the license plate unless and until the coil spring is totally withdrawn from the aligned openings. Again, the coiled spring is tightened so as to firmly engage the plate and there is no suggestion in the reference that the coiled spring could be used for any other function than that described and illustrated.

It is also known to provide a separable fastener assembly comprising a casing member which can be inserted through an opening provided therefor in a supporting member, the casing being constructed and arranged so that the leading edges thereof can be laterally outwardly upset to in effect provide a rivet. The casing further provides a stud member which is adapted to be snapped through an aperture in the supporting member to which the member supporting the casing can be secured. Although the member carrying the casing can thus be removed from the supporting member, there is no concept of a threading connection, and the casing and stud are not flexible as that term is employed in the context of the present invention concepts.

Applicant's prior U.S. Pat. No. 3,905,141 discloses an assembly which includes a bolt member containing a tightly wound coil spring. However, the spring is adapted to engage a correspondingly shaped and internally threaded nut member, in much the same manner as a threaded nut and bolt assembly. When threaded, it is impossible to remove the nut and bolt assembly without first disengaging the bolt member from the nut.

SUMMARY OF THE INVENTION

The fastener assembly in accordance with the present invention is principally characterized by its ability to be temporarily affixed or mounted through an opening in a supporting member so as to permit removal of the female member or both the male and female members of the fastener assembly. Such removal can be accomplished without tools, thereby permitting the assembly to be removed or relocated on the support member quickly and easily. Likewise, the entire assembly can be inserted through the opening therefor by simply applying finger pressure and without necessitating the use of tools. If desired, the bolt or male member of the assembly can be disengaged from the male member or nut prior to relocation and reassembly.

A further object of the invention is to provide a fastener assembly in which the nut member is constructed so that it can be snapped through an opening provided therefor in the support member. The body of the nut is constructed so as to permit the nut to be compressed as it is pushed through the opening, with the resilient nature of the material from which the nut is made permitting the body portion to expand following insertion to temporarily retain the nut in place in the absence of positively applied pressure thereto for removing the same. The intermediate portion of the nut is internally threaded to receive the coiled spring shank of the male fastener member, and the nut is provided with an enlarged head portion which is adapted to engage the support member when the nut is snapped into place. A very important feature of the invention is that the threaded portion of the nut member is limited to the intermediate portion thereof and does not extend into the leading end which is the portion of the nut which is compressed when the nut is inserted through the opening in the support member. Thus, there is no possibility of thread engagement in the compressible end of the nut, and as a result there is no expansion of the nut when the tightly wound spring bolt is threaded into the nut. Thus, the nut can be removed as easily with the bolt in engagement therewith as it can without being assembled with the bolt. This is an obvious advantage when it is desired to remove the assembly for repositioning or the like.

A still further object of the invention is to provide a fastener assembly in which the nut member, although readily removable as above described, is nevertheless securely mounted on the support member. As described, the nut includes a front head portion which tightly engages the support member, and the leading end of the nut, which is compressed when the nut is inserted through the opening in the support member, resiliently springs out after penetration through the opening so as to resiliently engage the surface of the back wall of the support member.

The fastener assembly of the invention is further characterized by the variety of used to which it can be put. The tightly wound spring shank of the bolt member engages the threads of the nut, and the position of the bolt head relative to the supporting member can be adjusted by controlling the thread penetration of the bolt shank into the nut member. This permits the bolt to be positioned closely adjacent or spaced from the object being supported, as desired. Moreover, the flexibility of the tightly wound spring shank permits the bolt member to be moved in any direction relative to the axis of the bolt to facilitate removal of the object mounted, and inserting a different object. A principal use of the fastener assembly is with signs, and the flexibility of the coil spring shank permits the shank to be moved outwardly relative to the edges of the sign to permit removal of the same and perhaps replacement by a sign bearing different indicia. The ability to change the signs while the fastener assemblies remain in place is an obvious improvement over other arrangements employing conventional fastener assemblies in which the male and female members must be disconnected before the sign or similar object can be removed.

A further important use of the invention is with ceiling panels. At the present time, ceiling panels, which range in size from 12"×12" up to 24"×48", are either secured directly, by adhesive or the like, to supporting structure, or are suspended from such supporting structure. This latter type of arrangement is particularly preferred where the supporting joists are not level or not uniformly on center. Where the ceiling panels are suspended or dropped from the ceiling, the panels are supported by T-bars which are hung from the joists or the underlayment of the floor above. Each panel is then supported by a laterally extending flange of the T-bar which is visible below the ceiling. This has certain esthetic drawbacks as well as requiring the panels to be lifted at least initially upwardly from their suppport on the flanges to gain access to the area above the panels, or for removing and replacing the panels. In accordance with the invention, the panels can be supported at each corner by a fastener assembly, the female member of which can be removably but securely retained in supporting structure above the panels. The only modification necessary in the panels is the provision of an opening at the juncture of the panels to receive the spring shank, and a countersunk opening to receive the head of the bolt. In this manner, the exposed bolt head can be made coplanar with the bottom surfaces of the panels thereby to provide an esthetically pleasing appearance. It will be understood that a fastener assembly is preferably provided at the juncture of four ceiling panels, and that the spring shank of the assembly will permit the bolt to be swung laterally thereby permitting the panel to be conveniently dropped downwardly for replacement or to gain access to the area above the panels.

The construction of the fastener assembly in accordance with the invention affords the further advantage of permitting relatively thin sheet material, such as paper, to be retained by the coil spring, as long as at least a portion of the spring remains exposed. Although the spring is a tightly wound helical coil, the movement of the outer end of the spring relative to the end anchored in the nut member serves to separate the adjacent coils sufficiently to permit a paper or similar thin sheet to be inserted between adjacent coils, after which the bolt head can be released and the spring shank returned to its normal position in which the axis of the shank is coincident with the axis of the bolt head and the threaded portion of the nut member. In this manner, a paper or thin sheet material is tightly gripped between adjacent coils thereby providing a quick and easy arrangement for posting memorandums or the like adjacent the support member. Although the present invention can be used with any support member of the requisite thickness and formed with openings for receiving the fastener assembly, apertured hard board or fiber board, commonly referred to as pegboard, is particularly adaptable.

These and other objects of the invention will be apparent as the following description proceeds in particular reference to the application drawing.

BRIEF DESCRIPTION OF THE APPLICATION DRAWING

FIG. 1 comprises a perspective view of the nut member of the fastener assembly in accordance with the invention;

DETAILED DESCRIPTION OF THE PREFERRED EMBODIMENTS

Figure 1:
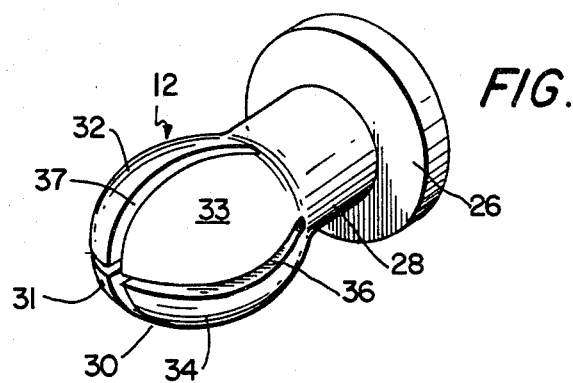
Figure 2:
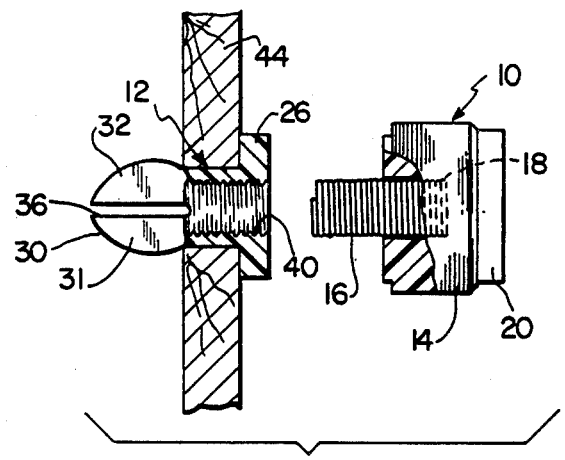
FIG. 2 is a side elevational view of the nut member and male fastener member, with the coil spring forming the shank of the male member being shown truncated in this figure.

Referring now in more detail to the application drawings, wherein like parts are indicated by like reference numberals, and initially to FIGS. 1-4, the fastener assembly includes a spring bolt generally indicated at 10 and a nut member generally indicated at 12. These members are shown separated in FIG. 2 and in an assembled position in FIG. 3. The spring bolt includes a preferably plastic bolt head 14 and a flexible, tightly wound spring 16 one end of which is mounted in an opening 18 therefor formed in the head 14. The mounting of the spring in the openeing 18 in the bolt head can be accomplished in any suitable manner, for example, by threading the coil spring into complementary threads formed in the opening 18, by adhesively bonding the coil spring to the walls of the opening 18, by force fitting the coil spring into such opening at elevated temperatures of the bolt head, or by any combination of these methods. The preferred method is to form the opening 18 with complementary threads, and additionally securing the connection by bonding.

In the form shown, the bolt head includes outer and inner reduced diameter portions 20 and 22, respectively, with the outer surface of the enlarged diameter main body portion of the bolt being preferably knurled to facilitate gripping the bolt for rotation thereof.

As noted, the spring 16 comprises a flexible, tightly wound helical spring, with the tight winding providing a peripheral surface comparable in terms of function and result to the threads of a solid bolt shank. The spring 16 is shown truncated in FIG. 2, and in full length in FIG. 3, although it will be understood that the length and diameter of the spring can be varied as desired. The spring 16 is metallic, and can be formed of any suitable metal material. An important feature of the fastener assembly is that by virtue of the tightly wound coil spring, the bolt 10 is able to function as a normal bolt for threaded engagement with the nut, while at the same time providing flexibility to permit movement of the bolt head in any desired direction, as will be hereinafter explained.

Referring to the construction of the nut member 12 (FIGS. 1-3), the same includes an enlarged diameter head portion 26, an intermediate section 28 the exterior surface of which is cylindrical, and a leading end section 30. The latter includes separate segments 31, 32, 33 and 34, separated by slots 36 and 37 which extend entirely through the section thereby to form the separate segments.

An opening 38 is formed in the nut member extending through the head portion 26 and the intermediate section 28, and such opening is threaded as shown at 40, with the shape and pitch of the thread being such as to receive the coil spring 16.

The outer surfaces of the sections 31-34 are curved, with the overall thickness of the sections in the region adjacent the supporting member 44 being greater than the diameter of the opening 42 formed in the supporting member.

The supporting member 44 can be formed of any suitable material in which one or more apertures are formed, with hard board, commonly known as pegboard, being one example. The openings formed in pegboard material are uniform in diameter so as to conveniently accept hardware, and the intermediate section 28 can be made of outside diameter slightly less than the diameter of the openings formed in the pegboard. The head 26 of the nut has flat inner and outer surfaces, with the inner surface tightly frictionaly engaging the adjacent surface of the support member 44.

To insert the nut 12 in and partially through the opening 42 in the support member, the nut is moved toward the opening, with the front curved surfaces of the sections 31-34 engaging the wall surrounding the opening. Due to the slots 36 and 37, the segments 31-34 are compressed inwardly thereby permitting such segments to move through the opening. Once through, the resilient nature of the material, preferably plastic, from which the nut is formed serves to move the segments 31-34 away from each other so that the regions of greatest thickness exceed the diameter of the opening, thereby providing a relatively tight frictional fit of the nut within the opening. The nut can be applied without special tools, and can be quickly and easily removed by applying outward pressure to the enlarged head 26 of the nut. This can be conveniently accomplished by applying thumbnail pressure to the inner planar surface of the head contiguous the surface of the support member 44. It will be understood that a knife, screwdriver or like instrument can also be used for this purpose, but the frictional retention of the nut provided by the segments 31-34 permits removal of the nut by thumbnail pressure with relative ease.

Figure 3:
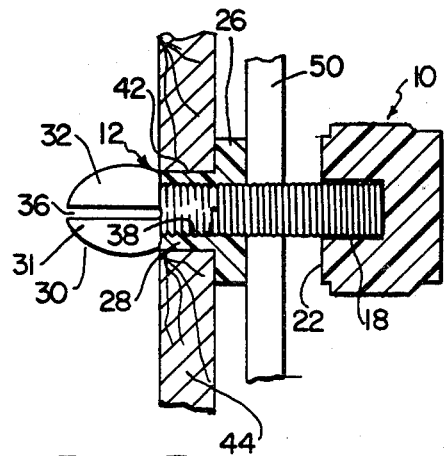
FIG. 3 is a sectional view through the nut member and male fastener member, showing the manner in which an object can be retained relative to a support member.

FIG. 3 illustrates the fastener assembly when fully assembled, and supporting a member 50 which can comprise, for example, a sign of the type commonly found in many buildings and institutions to indicate departments or sections. Although the member 50 can obviously comprise any member which is desired to be supported from the supporting member 44, the fastener in accordance with the present invention has found particularly advantageous use for graphic materials used in exhibits or displays.

Although the front portion 22 of the bolt head is shown spaced from the adjacent surface of the object 50, the spacing can be varied as desired simply by varying the degree to which the bolt is screwed into the threaded portion 40 of the nut member.

The fastener assembly is not intended to extend through an opening in the object 50, but positioned in openings in spaced locations around the periphery of the object 50 so as to support the same.

Figure 4:
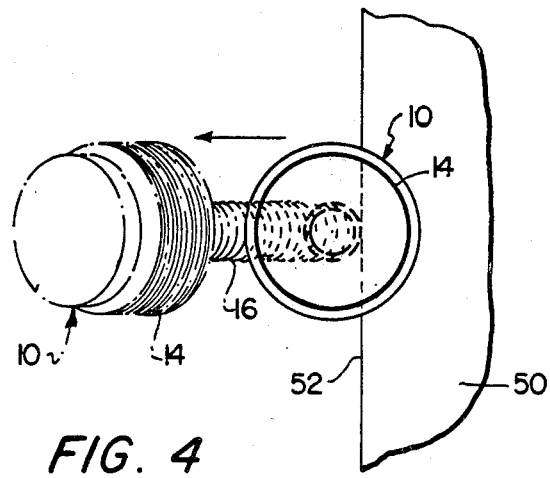
FIG. 4 is a front elevational view showing in solid lines the fastener assembly in place, positioned adjacent the edge of an object being retained, and shown laterally distorted in dashed lines so as to illustrate more clearly an important feature of the invention.

FIG. 4 illustrates a typical arrangement in which the nut 12 is inserted through an opening in the support member 44 so that the bolt spring 16 extends relatively adjacent but is spaced from the edge 52 of the object 50. Fastener assemblies will be arranged at suitable spaced locations around the object 50 so as to support the same. As shown in solid lines in FIG. 4, the bolt head 14 normally overlies the side edge of the object 50 thereby preventing outward removal of the object 50 without moving at least certain of the flexible springs 16 to a position in which the bolt head 14 clears the edge or edges of the object 50 to permit removal of the same.

The bolt head 14 is shown in dashed lines in FIG. 4 in a position outwardly of the edge of the object 50, with the movement of the bolt head toward such dashed line position being quickly and easily effected simply by moving the same laterally, with such movement being accommodated by the flexibility of the coil spring. If the object 50 is to be replaced by a similar object 50, for example, bearing different lettering or indicia, the bolt head is simply released following such replacement, with the coil spring returning the bolt head to the solid line position shown in FIG. 4.

As above noted, the controlled threading of the bolt varies the spacing of the bolt head from the object 50, with the degree of flexing of the coil spring and thus consequent movement of the bolt head depending upon the length of the coil spring disposed outwardly of the threaded connection with the nut. If desired, the bolt head can be advanced so that the front flange 22 engages the object 50, with this arrangement still providing a sufficient length of spring to permit flexing movement thereof to move the plane of the bolt head from the plane of the edge of the object 50.

As above noted, a very important feature of the present invention is the ability to secure the bolt in the nut without in any way affecting the ready removability of the nut from the opening in the supporting member. The frictional retention of the nut is not affected by the threading of the bolt into the nut member regardless of the depth of penetration of the spring, since the segments 31-34 are not expanded. The nut can therefore be removed without necessitating unscrewing of the bolt head from the nut, by simply applying small amounts of outward pressure as above described. The pressure serves to force the sections 31-34 toward each other as previously described to permit such sections to be withdrawn through the opening 42. Since the sections 31-34 are not expanded when the bolt engages the nut, as is the case with most expansible fastener assemblies, withdrawal of the nut can be quickly and easily achieved.

Although FIGS. 3 and 4 illustrate an arrangement in which the fastener assembly is used for retaining objects of substantial thickness, as indicated above very thin objects, such as paper of thin cardboard, can also be retained by the fastner assembly. When the bolt head is flexed as shown in dashed lines in FIG. 4, the individual coils are separated, thereby providing a space into which a sheet of paper or other thin material can be inserted. When the bolt head is released and the spring returned to its normal position, the paper or other thin sheet material is firmly held between adjacent turns of the coil, with removal of the paper or sheet being effected by subsequently flexing the spring, or by simply pulling the paper or sheet with sufficient firmness to overcome the resilient pressure applied by the adjacent turns of the coil spring on the sheet.

Both the bolt and nut members are preferably formed of plastic material, with experiences to date indicating that nylon is highly satisfactory. Other suitable plastic or other type materials could of course be employed, with the invention not residing in the particular type of resilient frictional material used.

As above noted, the fastener assembly of the present invention is also particularly adaptable for mounting ceiling tiles or panels, and reference is now made to FIGS. 5-10 which illustrate this use environment. Parts previously described and illustrated are indicated by the same reference numerals.

Figure 5:
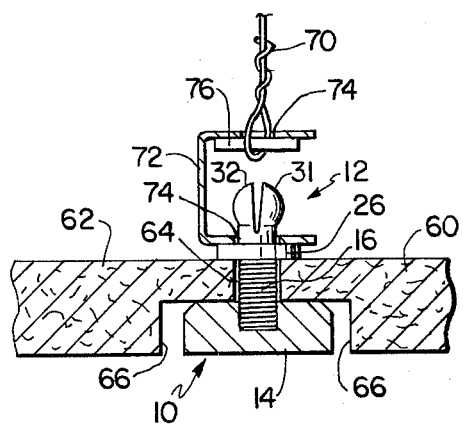
FIG. 5 is a fragmentary cross-sectional view of the fastener assembly of the present invention, showing the use of the assembly for mounting ceiling panels.

Referring to FIG. 5, the fastener assembly is essentially identical to that previously illustrated although the bolt is formed with a head 14 which is reduced somewhat in heighth relative to the bolthead shown previously. Ceiling panels 60 and 62 are shown juxtaposed in FIG. 5, and at the contiguous edges thereof, which normally comprise a corner of each panel, openings are drilled through the panels which, when the panels are positioned, provide a circular opening 64 through which the spring shank 16 of the bolthead loosely extends. Each panel is further formed with a recess commonly designated at 66, which extends slightly more than half way through the thickness of the panel. The recess 66 can be formed in any suitable manner, and when the panels are conjointly arranged, the recesses 66 define a circular recess the axis of which is concentric with the axis of the formed opening 64. It will be understood that where four such panels are arranged juxtaposed, an arcuate recess can be formed in each so as to collectively provide the circular recess shown. In this regard, it is most efficient and less expensive to provide a fastener assembly at the conjoined corners of the panels, although it will be understood that fastener assemblies could also be provided along the longitudinal or transverse contiguous edges of the panels. In any event, a circular opening 64 and circular recess 66 are formed in the contiguously disposed panels.

In FIG. 5, a suspended ceiling arrangement is illustrated, which includes a supporting wire 70 to which is secured a generally U-shape channel member 72. Openings 74 are formed in the legs of the channel at longitudinally spaced positions, with the nut member 12 extending through the leg 74 shown lowermost in FIG. 5, and the wire 70 extending through the opening 74 shown uppermost in FIG. 5. It is preferred that a bar 76 of relatively small diameter be secured to the leg of the channel below the uppermost opening 74, with the bar 76 generally intersecting the opening and serving as a means around which the wire can extend and subsequently be turned around itself for supporting the channel as shown in FIG. 5. It will be understood that wires are provided at spaced intervals along the length of the channel, and that the channel can be positioned at the desired vertical location from the supporting surface (not shown) and leveled in such position. The suspended type ceiling is particularly adaptable where joists or similar supporting members are not level and/or evenly spaced, and where sufficient head room exists for dropping or suspending the ceiling.

To install the panels as shown in FIG. 5, the nut member is snapped into the lowermost opening 74 of the channel 72 as previousy described. During such mounting, the segments 31-34 of the nut member are compressed and thereafter expand so as to resiliently retain the nut member in place, with the enlarged diameter portion 26 of the nut member tightly engaging the underside of the lower leg of the channel. The ceiling panels are thereafter positioned as shown in FIG. 5, with the opening 64 and recesses 66 either being preformed or formed on the site. The bolt 14 is thereafter threaded into the nut member 12 to secure the assembly, with the bolt being turned until the inner face thereof engages the bottom of the recess, at which time the exterior face of the bolt is generally coplanar with the bottom, exposed surfaces of the ceiling panels. The panels can thus be readily installed, and the exposed bolt head provides a much more esthetically pleasing appearance than the T-bars currently in use. It should also be noted that the fastener assemblies have sufficient strength to more than adequately support without sag panels which are 24"×24" in dimension, with the panels being supported only at each corner thereof. For larger panels, additional fastener assemblies may be desired, positioned perhaps intermediate the longitudinal sides of the panels.

Figure 6:
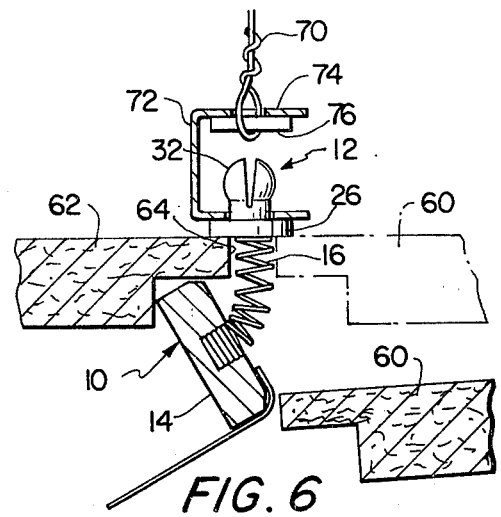
FIG. 6 is a view similar to FIG. 5 but showing the spring shank of the fastener assembly laterally dislaced for removing a ceiling panel.

FIG. 6 is comparable to FIG. 5, but shows the bolt 14 being laterally moved so as to permit the adjoining ceiling panel 60 to be removed. In FIG. 6, the ceiling panel 60 is shown in dashed lines in its FIG. 5 position. It will be noted that the bolt head 14 need only be laterally shifted a sufficient distance to permit the edge of the ceiling panel to clear the same. Reverting for a moment to FIG. 5, it will be noted that the recesses 66 provide a total recess which is substantially larger in diameter than the diameter of the bolt head 14, thereby providing room for lateral movement of the bolt head and consequent distortion of the spring shank 16. The total dimension of the recess relative to the diameter of the bolt head is chosen so as to make certain that when the bolt is shifted, there is clearance for the ceiling panels to be dropped downwardly as shown in FIG. 6. The panels can be lowered or dropped for replacement or to gain access to the area above the panels. Frequently, plumbing and electrical wiring are disposed above the suspended ceiling, and access thereto has been a continuing problem with suspended ceilings of the type presently employed. Where the panels are supported by T-bars, the panels must first be raised and then, if space permits, laterally shifted so as to permit access to the area above the panels. Such raising and shifting is oftentimes very difficult since obstructions are above the ceiling panels, for example, the wiring or plumbing to which access is desired to be made.

The spring shank 16 is resilient, and will return to its FIG. 5 position when released. Thus, once the panel 60, or a replacement therefor, has been moved upwardly into position, the bolt head 14 is released, and the same returned to its FIG. 5 position.

Figure 7:
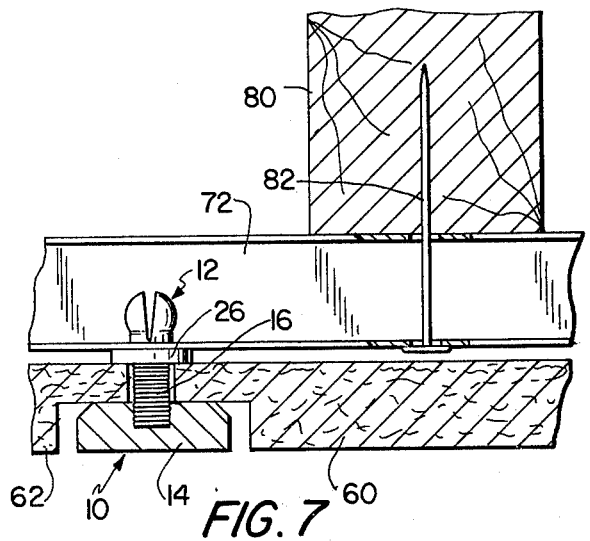
FIG. 7 is a view similar to FIG. 5 but showing the supporting channel secured directly to a joist.

Referring to FIG. 7, the channel 72 is illustrated therein secured directly to a supporting member or a joist 80. As shown, nails 82 are provided for mounting the channel, with the nail extending through the channel in those regions wherein openings have been formed in the upper and lower legs thereof, as above described. It will be apparent that other forms of fastening means, such as screws, construction staples, or the like may be employed rather than the nails shown. In any event, the head of the fastener, which obviously extends somewhat below the bottom surface of the channel, is accommodated in the space between the channel and the ceiling tiles provided by the head portion 26 of the nut member 12.

Figure 8:
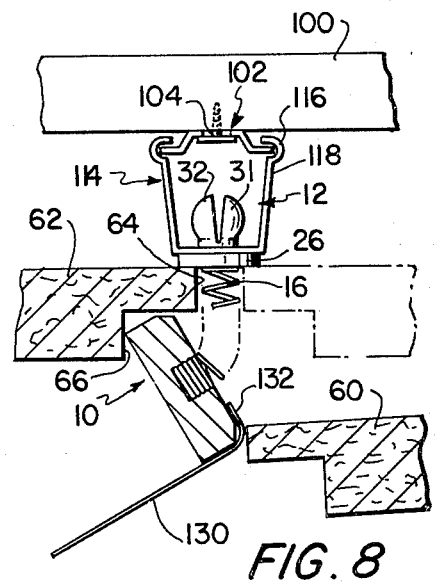
FIG. 8 is a fragmentary cross-sectional view of the fastener assembly of the invention, shown mounted on a clip secured to a track.
Figure 9:
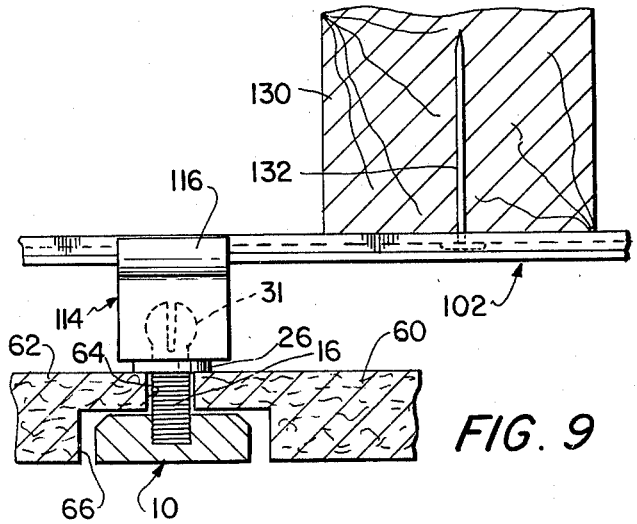
FIG. 9 is a side elevational view, taken at right angles to FIG. 8, and showing the supporting track mounted directly on a joist.
Figure 10:
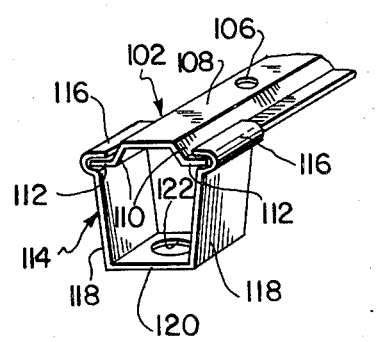
FIG. 10 is a fragmentary perspective view of the clip and track of FIGS. 8 and 9.

As above noted, frequently ceilings or other supporting structures from which ceiling panels are to be mounted directly or suspended are not level or the supporting structure not in correct alignment. This is a particular problem where the ceiling panels are attempted to be secured, by bonding or the like, directly to the supporting structure. In FIGS. 8–10, the fastener assembly of the present invention is employed with supporting members which provide substantial flexibility in terms of positioning the fastener assemblies at the desired locations, normally at the corners of a plurality of ceiling panels.

Referring to FIG. 8, a cross-bar 100 is provided, which may comprise the U-shaped channel shown in FIG. 5 or 7, or other conventional bar construction which is either suspended from the support structure or secured directly thereto. The constructional details of the cross-bar and the manner in which it is supported from the structure above form no part of the present invention. A track generally indicated at 102, a section of which is shown in FIG. 10, is secured at right angles to the track, and is secured to each cross-bar in any suitable manner, for example, by screw fasteners 104 which extend through openings 106 formed in the track. The openings 106 are preferably formed in the track at approximately 4" intervals thereby accommodating a wide range of spacings of the cross-bars 100 which extend transversely to the tracks. In addition, if necessary, additional holes 106 may be punched through the track for cross-bar alignment.

As best shown in FIG. 10, the track 102 comprises a central web 108, angled leg portions commonly designated at 110, and laterally directed flanges commonly designated at 112. A clip generally indicated at 114 is formed with shoulder portions 116 at the top thereof which are grooved to receive the flanges 112, as shown in FIGS. 8 and 10. The clip further includes side wall portions commonly designated at 118 and a bottom wall 120, with an opening 122 being formed in the bottom wall.

As can be seen in FIG. 8, the nut member 12 of the fastener assembly extends upwardly through the opening 122, with the flange 26 of the nut member tightly frictionally engaging the bottom surface of the bottom wall 120 of the clip. FIG. 8 is comparable to FIG. 6 in that it shows the bolt head 10 being laterally moved so as to permit the ceiling tile 60 to be dropped for access to the area above the ceiling tile or for replacement thereof. A generally L-shaped tool 130 having a top leg portion 132 can be conveniently used to move the bolt head laterally.

FIG. 9 illustrates the track 102 mounted directly to a joist 130 by nails 132 or similar fasteners. Similar tracks are mounted on the joist at spaced intervals, depending on the width of the tile to be installed. The clip 114 is shown in side view in FIG. 9, with the ceiling tiles 60 and 62 being in their normal installed position, as previously shown in FIG. 5.

The advantage of the FIGS. 8–10 forms of the invention is that the tracks can be mounted at the desired spacing to the cross-bar or joist, and the clip thereafter positioned at the desired location at the juncture of the ceiling panels. The clips can be positioned on the track as shown in FIG. 10 either before the track is mounted, or if preferred, after the track is mounted. In this regard, the clip is preferably formed of spring steel which permits the side walls 118 thereof to be flexed outwardly to permit the grooves of the shoulders 116 of the clip to be aligned with the flanges 110 of the track. The shoulders are then released thereby resiliently engaging the flanges. To secure the mounting of the clip at the desired position, the side walls 118 can be slightly crimped under pressure so as to secure the clip on the track. The track and clip arrangement thus provides the desired flexibility in both directions to accommodate ceiling panels of varying sizes.

The installation of the ceiling panels is as above described with reference to FIGS. 5–7. The panels are either preformed or formed at the site with openings at the corners thereof which collectively provide a circular opening for receiving the spring shank 16 of the fastener assembly. Each ceiling panel is also formed with a recess 66 which collectively define a circular recess the axis of which is concentric with the opening 64 which receive the spring shank 16.

After the nut member 12 is snapped into place and the ceiling panels positioned so as to form the opening 64 and the recesses 66, the spring shank 16 of the bolt head is threaded into the threaded opening of the nut member until the bolt head is positioned approximately as shown in FIG. 9. Each joint is mounted accordingly, and provides a highly attractive ceiling, with the exposed face of the bolt head being the only exposed component of the mounting assembly. Thus, a more pleasant ceiling panel installation is provided than in previous support systems wherein T-bars or the like are used to support the panels in place.

It will be understood that although the bolt head has been shown recessed in the ceiling panels so as to be coplanar with the surfaces thereof, the bolt head could be exposed below the panel surfaces. In such event, the panels could be preformed or drilled on site with only the opening 64 to receive the spring shank, with the recesses 66 being eliminated. In addition, the recess 66 and bolt head 10 could be formed of varying shapes in addition to the circular shape shown.

I claim:

1. A fastener assembly comprising
   (a) a female nut member having a relatively enlarged head portion adapted to abut a supporting member having at least one opening therethrough, an intermediate section having an outside diameter slightly less than the diameter of said opening in said supporting member so as to be able to extend therethrough, and a leading end section comprised of a plurality of internally and externally unthreaded segments separated by slot means extending through said segments, said female nut member being formed of a resilient material with the dimension of said segments, when compressed, being greater in at least certain regions thereof than the diameter of said opening in said supporting member, the construction of said leading end section being such that said segments are compressed when said leading end is inserted through said opening in said supporting member, with said segments thereafter expanding away from each other to said greater dimension so as to temporarily and removably retain said nut member in said opening; a central opening extending through said head portion and said intermediate section of said nut and terminating short of said leading end section, said central opening being threaded along at least a portion of its length, and
   (b) a male spring bolt comprising a bolt head and a flexible tightly wound helically coiled spring secured at one end in a recess provided therefor in said bolt head, the diameter and pitch of the coils of said spring corresponding to the diameter and pitch of the threads of said central opening thereby to permit threaded engagement of said coiled spring in said central opening, the threaded penetration of said coiled spring terminating short of said segments and being such as to leave an outwardly exposed portion of said coiled spring so as to provide space between said bolt head and said supporting member to receive an object therebetween, the flexibility of said spring permitting movement of the exposed portion of said spring in any direction to facilitate removal of said object or replacement of siid object with another object.

2. The fastener assembly of claim 1 wherein the leading end section of said female nut member comprises segments which are curved at the periphery thereof from the juncture of said leading end section with said intermediate section to the front edges of said segments, the curvature of said segments in the region thereof closely adjacent said intermediate section being such as to provide a total dimension greater than the diameter of said opening in said supporting member, the curvature thereafter tapering downwardly and inwardly to a generally blunt front edge, with such downwardly and inwardly tapering surfaces providing cam surfaces by means of which the segments can be forced toward each other by virture of said slot means in order to permit insertion of said leading end section through said opening in said supporting member.

3. The fastener assembly of claim 1 wherein said coiled spring is secured in said bolt head by providing the latter with a threaded recess the diameter and pitch of which generally correspond to the diameter and pitch of said coiled spring.

4. The fastener assembly of claim 3 wherein said coiled spring is further secured in said recess in said bolt head by adhesive bonding.

5. The combination of ceiling panels and fastener assemblies for supporting said panels from a supporting structure comprising;
   (a) supporting members suspended from or attached to said supporting structure, said supporting members being formed with at least one opening;
   (b) a plurality of ceiling panels each of which is formed at a corner thereof with an opening therethrough, with said openings when said panels are juxtaposed defining a generally cylindrical opening, said panels being further formed at each corner with a relatively enlarged recess, with said recesses when said panels are juxtaposed forming a generally circular recess concentric with said openings, and
   (c) fastener assemblies for removably mounting said panels to said supporting members, each of said fastener assemblies comprising
      (i) a female nut member having a relatively enlarged head portion adapted to abut a supporting member having at least one opening therethrough, an intermediate section having an outside diameter slightly less than the diameter of said opening in said supporting member so as to be able to extend therethrough, and a leading end section comprised of a plurality of segments separated by slot means extending through said segments, said female nut member being formed of a resilient material, with the dimension of said segments, when uncompressed, being greater in at least certain regions thereof than the diameter of said opening in said supporting member, the construction of said leading end section being such that said segments are compressed when said leading end is inserted through said opening in said supporting member, with said segments thereafter expanding away from each other to said greater dimension so as to temporarily and removably retain said nut member in said opening; a central opening extending through said head portion and said intermediate section of said nut and terminating short of said leading end section, said central opening being threaded along at least a portion of its length, and
      (ii) a male spring bolt comprising a bolt head and a flexible tightly wound helically coiled spring secured at one end in a recess provided therefor in said bolt head, the diameter and pitch of the coils of said spring corresponding to the diameter and pitch of the threads of said central opening thereby to permit threaded engagement of said coiled spring in said central opening, the threaded penetration of said coiled spring normally being such as to leave an outwardly exposed portion of said coiled spring so as to provide space between said bolt head and said supporting member to receive a thickness of said panels therebetween, the flexibility of said spring permitting movement of the exposed portion of said spring in any direction to facilitate removal of said panels or replacement of said panels with other panels.

6. The combination of claim 5 wherein the leading end section of said female nut member comprises segments which are curved at the periphery thereof from the juncture of said leading end section with said intermediate section to the front edges of said segments, the curvature of said segments in the region thereof closely adjacent said intermediate section being such as to provide a total dimension greater than the diameter of said opening in said supporting member, the curvature thereafter tapering downwardly and inwardly to a generally blunt front edge, with such downwardly and inwardly tapering surfaces providing cam surfaces by means of which the segments can be forced toward each other by virtue of said slot means in order to permit insertion of said leading end section through said opening in said supporting member.

7. The combination of claim 5 wherein said coiled spring is secured in said bolt head by providing the latter with a threaded recess the diameter and pitch of which generally correspond to the diameter and pitch of said coiled spring.

8. The combination of claim 5 wherein said coiled spring is further secured in said recess in said bolt head by adhesive bonding.

9. The combination of claim 5 wherein said supporting members comprise a U-shaped channel at least the bottom leg of which is formed with an opening slightly less in diameter than the dimension of said segments of said leading end section of said female nut member, when uncompressed, the penetration of said segments through said opening serving to compress said segments, which thereafter expand away from each other to a dimension greater than the dimension of said opening thereby retaining said nut member and thus said fastener on said U-shaped channel.

10. The combination of claim 9 wherein the leg of said U-shaped channel opposite to said first recited leg is also formed with openings through which a wire extends for suspending said channel from a supporting surface, said wire being positioned around a bar secured to said other leg and intersecting said opening below the same.

11. The combination of claim 9 wherein said U-shaped channel is secured directly to the supporting member by fasteners or the like.

12. The combination of claim 8 wherein said recess is sufficiently greater in dimension than the diameter of said bolt head so as to permit said bolt head to be engaged and moved laterally within said recess a sufficient distance to permit removal of the adjoining ceiling panel.

13. The combination of claim 5 wherein said supporting members include a resilient clip formed with resilient side walls, a bottom wall, and shoulders at the upper end thereof, said shoulders defining a groove, and track means secured to said supporting structure, said track means including a flat center web portion and laterally extending flanges which extend into the grooves formed in the shoulders of said clip, whereby the side walls and shoulders of said clip can be sprung outwardly for movement along said track and subsequently released and crimped to said track at the desired location, said bottom wall of said clip being formed with an opening through which said nut member can extend for retaining said fastener assembly on said clip, the diameter of said opening in said clip member being less than the uncompressed dimension of said segments of said leading end section of said nut member.

14. The combination of claim 13 wherein said tracks are mounted to transversely extending cross-bars, with said tracks being spaced a predetermined distance commensurate with the size of the ceiling tile to be mounted, with the spacing of said track means and the adjustable location of said clip means facilitating use of the fastener assembly with various size ceiling panels.

15. The combination of claim 13 wherein a plurality of spaced tracks are secured directly to said supporting structure.

16. The combination of claim 13 wherein the circular recess formed by a plurality of said ceiling panels is greater in dimension than the diameter of said bolt head thereby to facilitate grasping said bolt head and moving the same laterally so as to permit adjoining ceiling tiles to be removed.

* * * * *